United States Patent
Ito et al.

(10) Patent No.: US 9,007,179 B2
(45) Date of Patent: Apr. 14, 2015

(54) ELECTRONIC APPARATUS

(71) Applicant: Panasonic Corporation, Kadoma-shi, Osaka (JP)

(72) Inventors: Naoyuki Ito, Osaka (JP); Takehiro Itotani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 142 days.

(21) Appl. No.: 13/937,851

(22) Filed: Jul. 9, 2013

(65) Prior Publication Data
US 2014/0285310 A1 Sep. 25, 2014

(30) Foreign Application Priority Data
Mar. 25, 2013 (JP) ................................. 2013-062023

(51) Int. Cl.
| | |
|---|---|
| *G05B 23/02* | (2006.01) |
| *G08B 13/14* | (2006.01) |
| *G06F 7/00* | (2006.01) |
| *G05B 19/00* | (2006.01) |
| *E05B 65/00* | (2006.01) |
| *G06K 5/00* | (2006.01) |
| *G06F 1/16* | (2006.01) |

(52) U.S. Cl.
CPC .................... *G06F 1/1616* (2013.01)

(58) Field of Classification Search
USPC ....................................................... 340/10.1
See application file for complete search history.

(56) References Cited

U.S. PATENT DOCUMENTS

| | | | | |
|---|---|---|---|---|
| 7,394,377 | B2* | 7/2008 | Banerjee | 340/572.1 |
| 2003/0134632 | A1* | 7/2003 | Loughran | 455/423 |
| 2004/0113791 | A1* | 6/2004 | Salim et al. | 340/572.3 |
| 2007/0075142 | A1* | 4/2007 | Bellows et al. | 235/451 |

FOREIGN PATENT DOCUMENTS

JP 2010-066794 * 3/2010 ............. H06K 17/00

* cited by examiner

*Primary Examiner* — Jennifer Mehmood
*Assistant Examiner* — Pameshanand Mahase
(74) *Attorney, Agent, or Firm* — Hamre, Schumann, Mueller & Larson, P.C.

(57) ABSTRACT

Provided is a convertible type computer (PC) 1 comprising a second housing 3 including a display section 3a, and a first housing 2 including a palm rest 2b. A first antenna 6a is disposed on the palm rest 2b, and a second antenna 7a is disposed on a reverse surface 2e of the first housing 2 immediately beneath the first antenna 6a. An attitude sensor 8 detects whether the PC 1 has a clam shell form or a tablet form. In accordance with a detection result, a switch section 9 switches between the first antenna 6a and the second antenna 7a for establishing wireless communication with an external terminal to communicate information. Therefore, it is possible to switch between information signals through the first antenna 6a and information signals through the second antenna 7a depending on the attitude of the PC 1, and fine communication can be established.

3 Claims, 6 Drawing Sheets

ELECTRONIC APPARATUS

BACKGROUND

1. Field

The present disclosure relates to an electronic apparatus configured to switch between and use inputs from multiple RFID readers.

2. Description of the Related Art

Japanese Laid-Open Patent Publication No. 2010-066794 discloses a non-contact type IC card reader disposed on a palm rest located on an obverse surface of a housing of a hand-held computer.

SUMMARY

The present disclosure provides an electronic apparatus configured to switch between and use multiple RFID readers.

In one general aspect of the present disclosure, the techniques disclosed here feature an electronic apparatus comprising: a first housing including an operation section configured to accept an input from a user; a second housing including a display section configured to present information to the user; a support configured to support a positional relationship between the first housing and the second housing in a shiftable manner at least between a first state and a second state; a first RFID reader and a second RFID reader configured to establish information communication with an external terminal located nearby via a transmission-and-reception surface by using near field communication; a communication control section configured to control a content of the information communication established with the first RFID reader or the second RFID reader; an attitude sensor configured to sense a shift in a positional relationship between the first housing and the second housing caused through the support; and a switch section configured to, based on a sensing result from the attitude sensor, cause the communication control section to control a content communicated by the first RFID reader in the first state, and cause the communication control section to control a content communicated by the second RFID reader in the second state.

The electronic apparatus according to the present disclosure having the above described configuration is capable of conducting near field communication with an external terminal using the first RFID reader and the second RFID reader in accordance with the state of the electronic apparatus used by the user.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

In the following, description will be provided using, as an example of an electronic apparatus of one embodiment, a convertible type computer (hereinafter, referred to as "PC") capable of reversibly transforming between a clam shell form and a tablet form.

[Configuration of PC]

Figure 1:
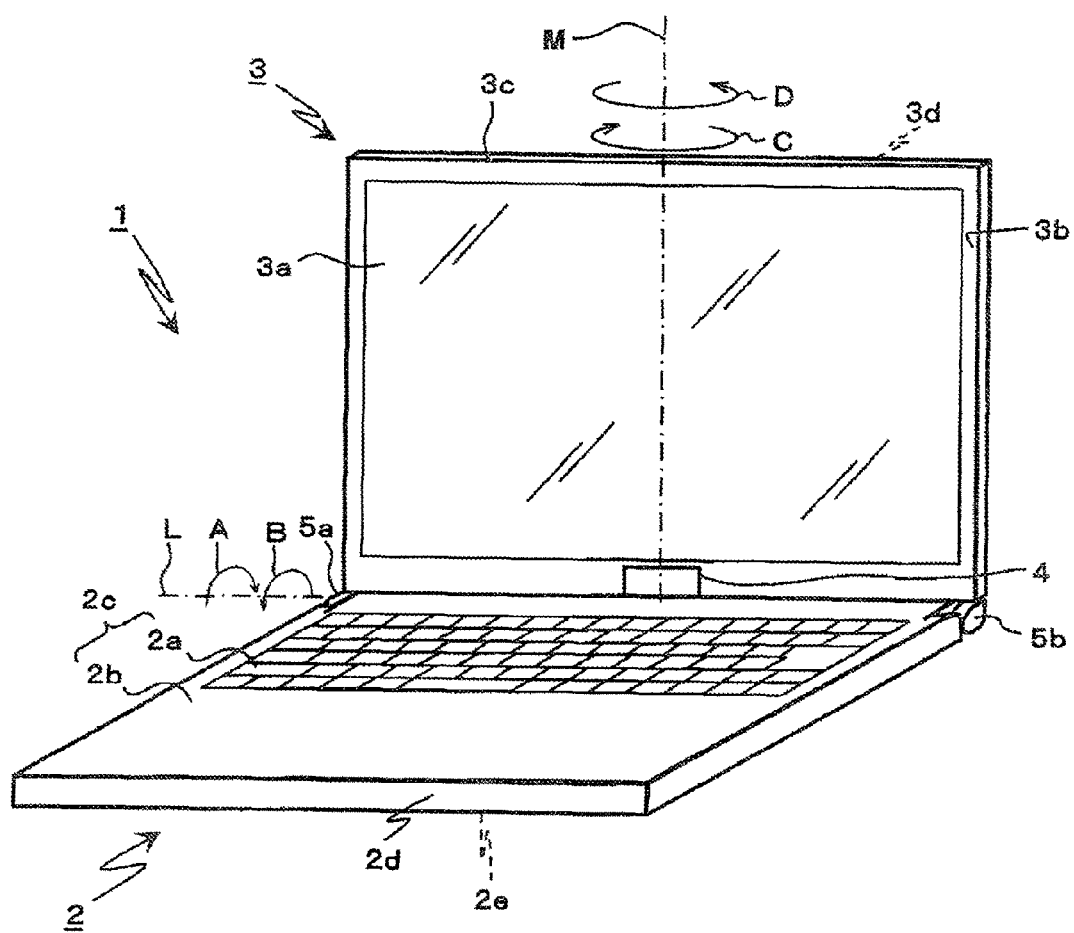
FIG. 1 is a perspective view of a PC operated in a clam shell form.

FIG. 1 is a perspective view of a PC 1 operated in a clam shell form. The PC 1 includes a hinge portion 4 that rotatably supports a first housing 2 and a second housing 3.

The first housing 2 has an obverse surface 2c including a keyboard 2a and a palm rest 2b. The first housing 2 has a front surface 2d and a reverse surface 2e. The second housing 3 has a front surface 3b on which a display section 3a is disposed. Furthermore, the second housing 3 has, when the user of the PC 1 types on the keyboard 2a, a top surface 3c located on the top of the display section 3a and a rear surface 3d located on the back side of the display section 3a. It should be noted that the directions of top and bottom, and obverse and reverse of the PC 1 are directions obtained when the user views the PC 1 when operating the PC 1 in a clam shell form as shown in FIG. 1.

The obverse surface 2c may include a pointing device or the like for changing the position or the like of a cursor displayed on the display section 3a. The keyboard 2a and the pointing device function as an operation section for accepting input from the user. The palm rest 2b can be used for resting hands when the user types on the keyboard 2a. Furthermore, on a lateral surface connecting the obverse surface 2c and the reverse surface 2e of the first housing 2, it is possible to include a LAN (Local Area Network) connector or a USB (Universal Serial Bus) connector for connecting an external instrument, and terminals such as a terminal for driving the PC 1 and charging a secondary battery via an adapter from a commercial power source. In addition, components interposed between the obverse surface 2c and the reverse surface 2e of the first housing 2 include drives such as an optical disk drive and a hard disk drive for storing data of the PC 1, a circuit board having mounted thereon electronic components for controlling the PC 1, secondary batteries, and the like.

A driving circuit board for driving the display section 3a may be disposed in the second housing 3. The display section 3a presents information to the user by displaying various characters and pictures.

Figure 2:
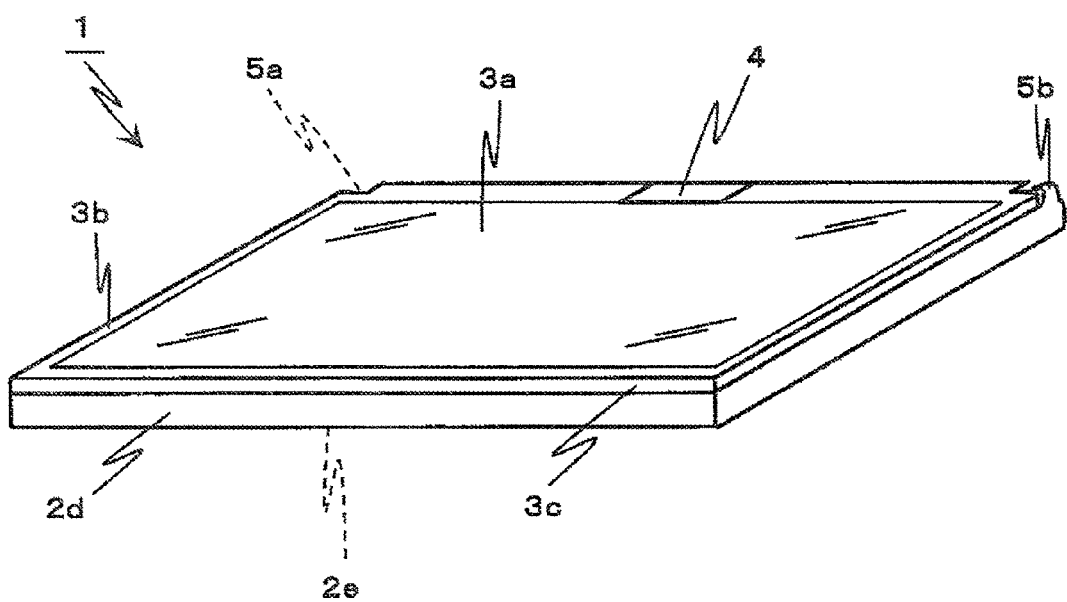
FIG. 2 is a perspective view of the PC operated in a tablet form.

The hinge portion 4 is a biaxial hinge having an opening-and-closing hinge mechanism and a rotary hinge mechanism. The opening-and-closing hinge mechanism enables reversible opening and closing in directions indicated by arrows A and B about an axis L, between a state in which the display section 3a is in most proximity to the obverse surface 2c, and a state in which the display section 3a is unveiled from the obverse surface 2c as shown in FIG. 1. The rotary hinge mechanism enables reversible rotation in directions indicated by arrows C and D about an axis M positioned perpendicular with respect to the obverse surface 2c in the state shown in FIG. 1. The PC 1 of the present embodiment includes one pair of rotation locking parts 5a and 5b that are disposed along axis L used when the first housing 2 and the second housing 3 are opened and closed, and which restrict rotation of the second housing 3 to not more than 180 degrees when the second housing 3 rotates about axis M with respect to the first housing 2. It should be noted that the rotation locking parts 5a and 5b are formed as, as shown in FIG. 2, a convex shape engagement piece disposed on one end of the bottom surface of the second housing 3 most distally located from shaft M, and an concaved shaped engagement reception part that abuts and engages the engagement piece. Such configuration is one example, and other configurations may be used such as, for example, having on the rotary hinge mechanism a rotation restricting part configured to restrict rotation. Furthermore, there may be cases where a configuration for restricting rotation of the second housing 3 with respect to the first housing 2 is not necessary.

The PC 1 assumes the state shown in FIG. 2 when the second housing 3 is rotated about axis M of the hinge portion 4 with respect to the first housing 2, and when the rear surface 3d is brought in proximity with the obverse surface 2c about axis L to be closed. Thus, the rear surface 3d covers the palm rest 2b and the keyboard 2a, and a transition to a tablet form in which the user views the display section 3a is made.

As described above, the hinge portion 4 has a function as a support that supports the positional relationship of the first housing 2 and the second housing 3 in a manner shiftable between the state of a clam shell form shown in FIG. 1 and the state of a tablet form show in FIG. 2.

Figure 3:
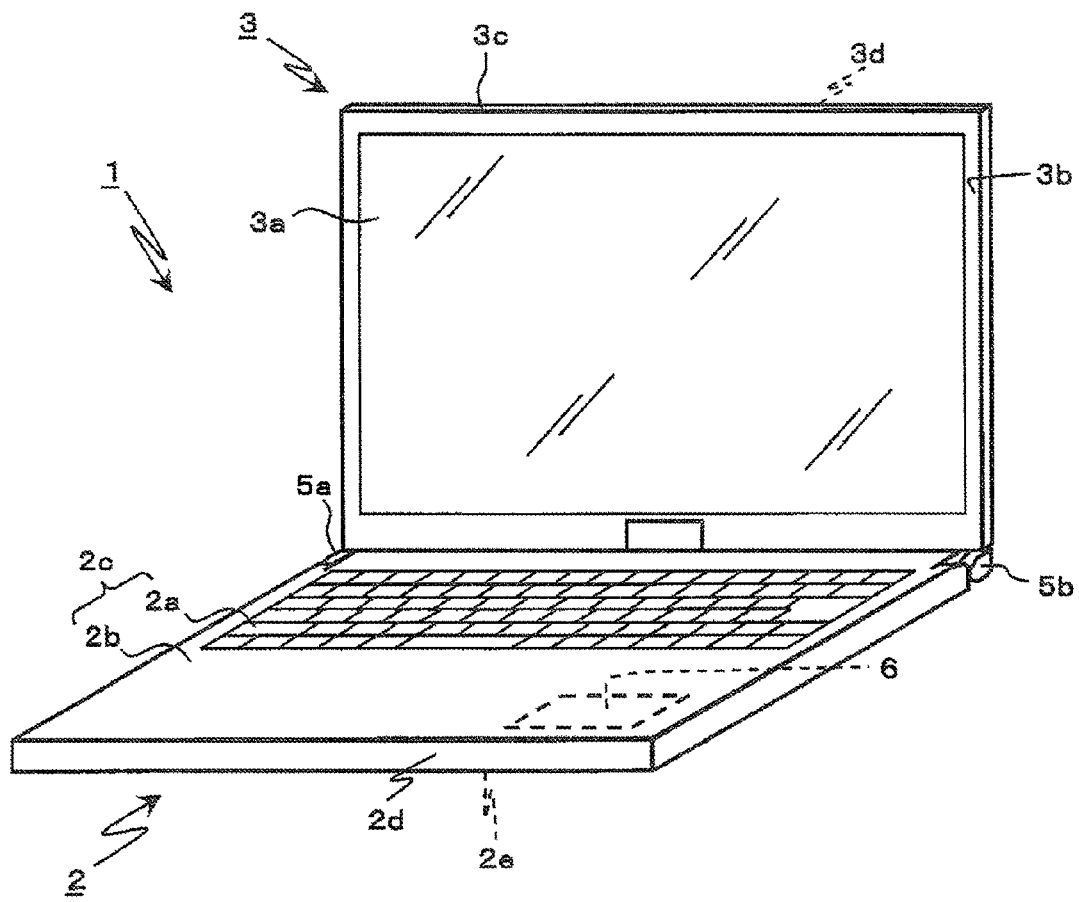
FIG. 3 is a perspective view in which a first antenna is disposed on a palm rest of the PC.

FIG. 3 is a perspective view in which a first antenna is disposed on the palm rest of the PC. The PC 1 of the present embodiment has a first RFID reader 6 disposed in the vicinity of one angle part (the right side in the state in FIG. 3 in the present embodiment) of the palm rest 2b, i.e., on a side of the front surface 2d of the keyboard 2a. The first RFID reader 6 can communicate information with an external terminal located nearby in a non-contact state through near field communication. In the present embodiment, an RFID (Radio Frequency Identification) tag is used as an external terminal. The first RFID reader 6 receives output signals from the RFID tag in a non-contact state. The first RFID reader 6 includes a first antenna 6a (described later) for transmitting and receiving data to and from an RFID tag, and a communication control section 10 (described later). The RFID tag of the present embodiment uses a frequency of 13.56 MHz conforming to ISO14443 standard. The area of the first antenna 6a included in the first RFID reader 6 is an approximately rectangular shape having a height of 3 cm and a width of 5 cm. The first antenna 6a is located on the surface through which the first RFID reader 6 transmits and receives wireless signals, and is shown in FIG. 3 with a dotted line. The first antenna 6a is disposed inside the first housing 2. The first antenna 6a is attached firmly to the obverse surface 2c formed from ABS (acrylonitrile-butadiene-styrene) resin to allow penetration of radio waves having a frequency of 13.56 MHz.

Figure 4:
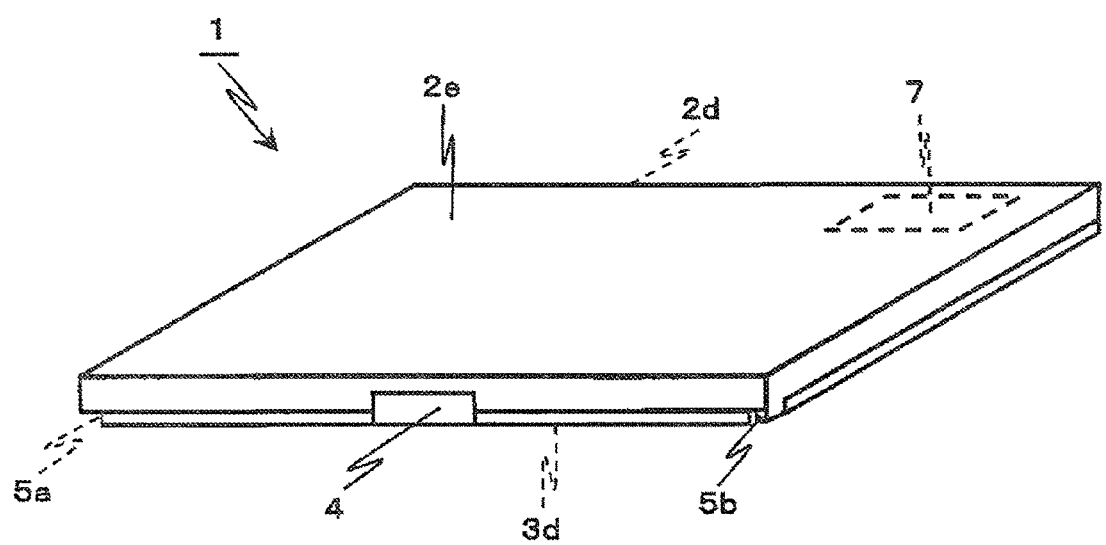
FIG. 4 is a perspective view in which a second antenna is disposed on a rear surface of the PC.

FIG. 4 is a perspective view in which a second antenna is disposed on the rear surface of the PC. The PC 1 of the present embodiment also has a second RFID reader 7 disposed on the rear surface 3d as shown in FIG. 4. The second RFID reader 7 can communicate information with an external terminal located nearby in a non-contact state through near field communication. In the present embodiment, an RFID tag is used as an external terminal The second RFID reader 7 receives output signals from the RFID tag in a non-contact state. The second RFID reader 7 includes a second antenna 7a (described later) for transmitting and receiving data to and from an RFID tag, and the communication control section 10 (described later). Similar to the first RFID reader 6 described above, the second RFID reader 7 receives output signals from the RFID tag in a frequency of 13.56 MHz conforming to standard ISO14443 in a non-contact state. The area of the second antenna 7a included in the second RFID reader 7 is an approximately rectangular shape having a height of 3 cm and a width of 5 cm. The second antenna 7a is located on the surface through which the second RFID reader 7 transmits and receives wireless signals, and is shown in FIG. 4 with a dotted line. The second antenna 7a is disposed inside the first housing 2. The second antenna 7a is attached firmly to the reverse surface 2e formed from ABS resin to allow penetration of radio waves having a frequency of 13.56 MHz. In the present embodiment, the second RFID reader 7 is arranged on a surface which is an orthographic projection of a position of the first RFID reader 6 disposed on the obverse surface 2c onto the reverse surface 2e of the first housing 2.

As described above, the first RFID reader 6 and the second RFID reader 7 are respectively disposed on the obverse surface 2c and the reverse surface 2e of the first housing 2. Furthermore, as shown in FIG. 3, the first antenna 6a transmits and receives data to and from the RFID tag in an attitude assumed by the PC 1 when being used in the clam shell form. In the attitude assumed by the PC 1 when the user uses it in the clam shell form, the transmission-and-reception surface of the first RFID reader 6 and the display section 3a are both exposed to the side of the user. As shown in FIG. 4, the second antenna 7a performs transmission and reception in an attitude in the tablet form. Thus, the antenna used for transmitting and receiving data to and from the RFID tag has to select the first RFID reader 6 or the second RFID reader depending on the attitude of the PC 1.

Figure 5:
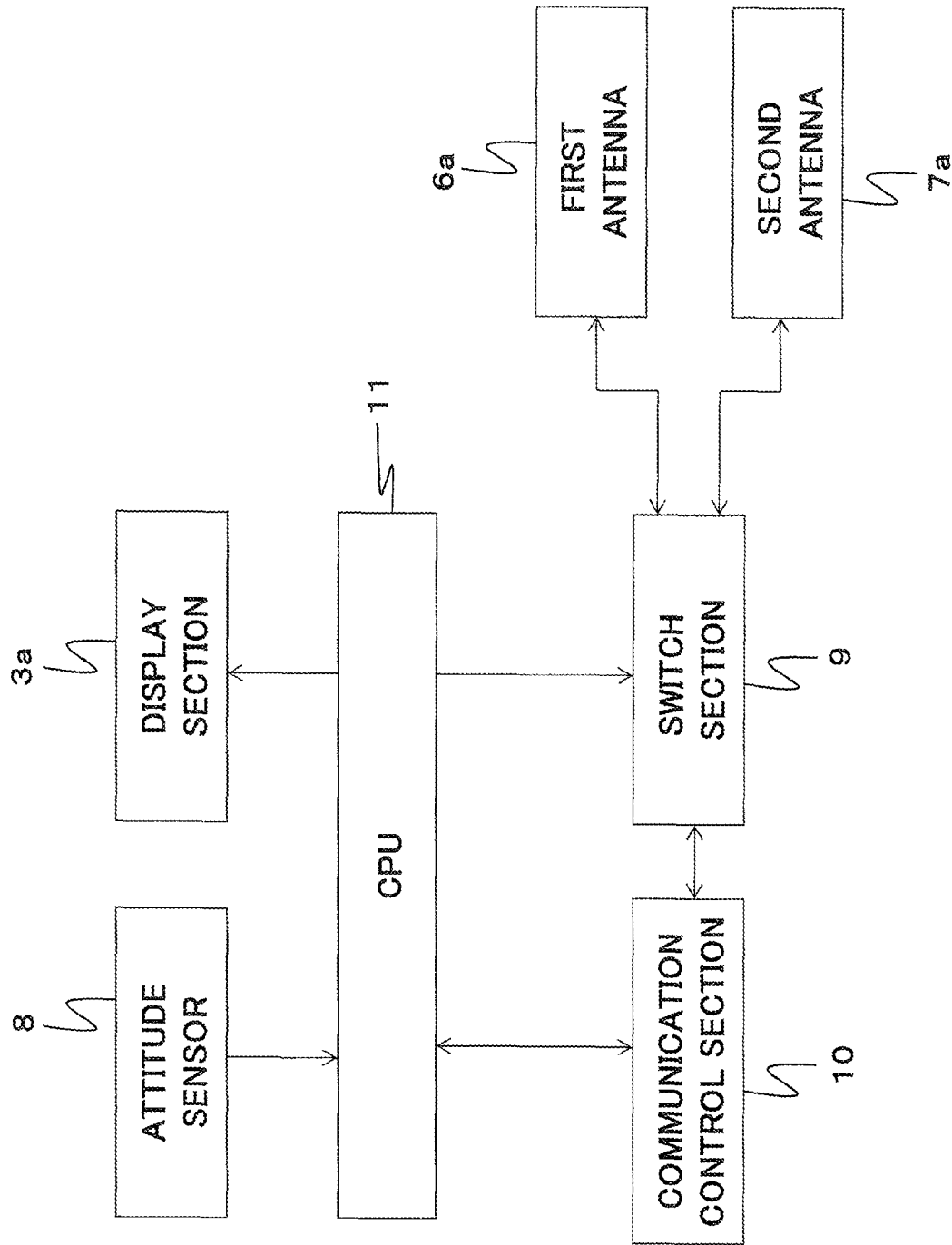
FIG. 5 is a block diagram showing one example of a circuit configuration of the PC.

FIG. 5 is a block diagram showing one example of a circuit configuration of the PC. An attitude sensor 8 senses a shift in a positional relationship between the first housing 2 and the second housing 3 caused through the hinge portion 4. Whether the PC 1 is in the clam shell form or the tablet form is determined by the attitude sensor 8 by detecting the current attitude of the PC 1. One example of the attitude sensor 8 is a magnetic switch (e.g., a switch utilizing a Hall sensor) disposed inside the first housing 2. When the magnetic switch senses a magnet disposed inside the second housing 3 being in proximity, the PC 1 determines that it is in the tablet state by the attitude sensor 8. When the magnetic switch does not sense the magnet disposed inside the second housing 3 being in proximity, the PC 1 determines that it is in the clam shell state by the attitude sensor 8. It should be noted that a three-dimensional gravity sensor may be used as the attitude sensor 8. The three-dimensional gravity sensor may be disposed on either one of the first housing 2 and the second housing 3. It should also be noted that the attitude sensor 8 may be formed from something other than a sensor. Specifically, it is possible to have the user explicitly specify the current attitude of the PC 1.

A switch section 9 switches a control content of the communication control section 10 based on the sensing result obtained by the attitude sensor 8. One implementation example of the switch section 9 may be a switching element or the like configured to use as a trigger a detection result from the attitude sensor 8 conveyed by a CPU 11, and switch between data transmitted and received by the first antenna 6a and data transmitted and received by the second antenna 7a. Specifically, the switch section 9 performs the switching such that a signal route through which the communication control section 10 conducts processes is connected to the first antenna 6a when the PC 1 is in the clam shell state, and performs the switching such that the signal route through which the communication control section 10 conducts processes is connected to the second antenna 7a when the PC 1 is in the tablet state. Here, switching the signal route not only includes physically switching electrical conduction, but also includes switching a process content of the communication control section 10 by means of a logical circuit or a program. In addition, the switch section 9 may reduce power used by an antenna that is not controlled by the communication control section 10. Furthermore, one part or all of the functions of the switch section 9 may be integrated in and achieved by the CPU 11. In the present embodiment, although the switch section 9 acquires the sensing result from the attitude sensor 8 via the CPU 11 connected to the attitude sensor 8, the present disclosure is not limited thereto. For example, the sensing result may be acquired directly from the attitude sensor 8 not via the CPU 11.

The communication control section 10 controls a content of information communication established with each of the RFID readers. Controlling content of information communication includes, for example, encoding electrical signals acquired by each of the RFID reader into a format processable by the CPU 11. In addition, controlling the content of information communication includes converting a communication code generated by the CPU 11 into electrical signals that can be transmitted to an external terminal by each of the RFID readers. In the present embodiment, although the communication control section 10 is controlled by the CPU 11, the present disclosure is not limited thereto. One part or all of the functions of the communication control section 10 may be, for example, integrated in the CPU 11 that controls the whole PC 1.

The CPU 11 controls the display section 3a, the attitude sensor 8, the switch section 9, and the communication control section 10. In the present embodiment, the attitude of the PC 1 detected by the attitude sensor 8 is transmitted to the CPU 11 as a sensing result, and the CPU 11 transmits the sensing result to the switch section 9. In the present embodiment, a content of information communication controlled by the communication control section 10 is computed and generated by the CPU 11.

[Operation of PC]

Figure 6:
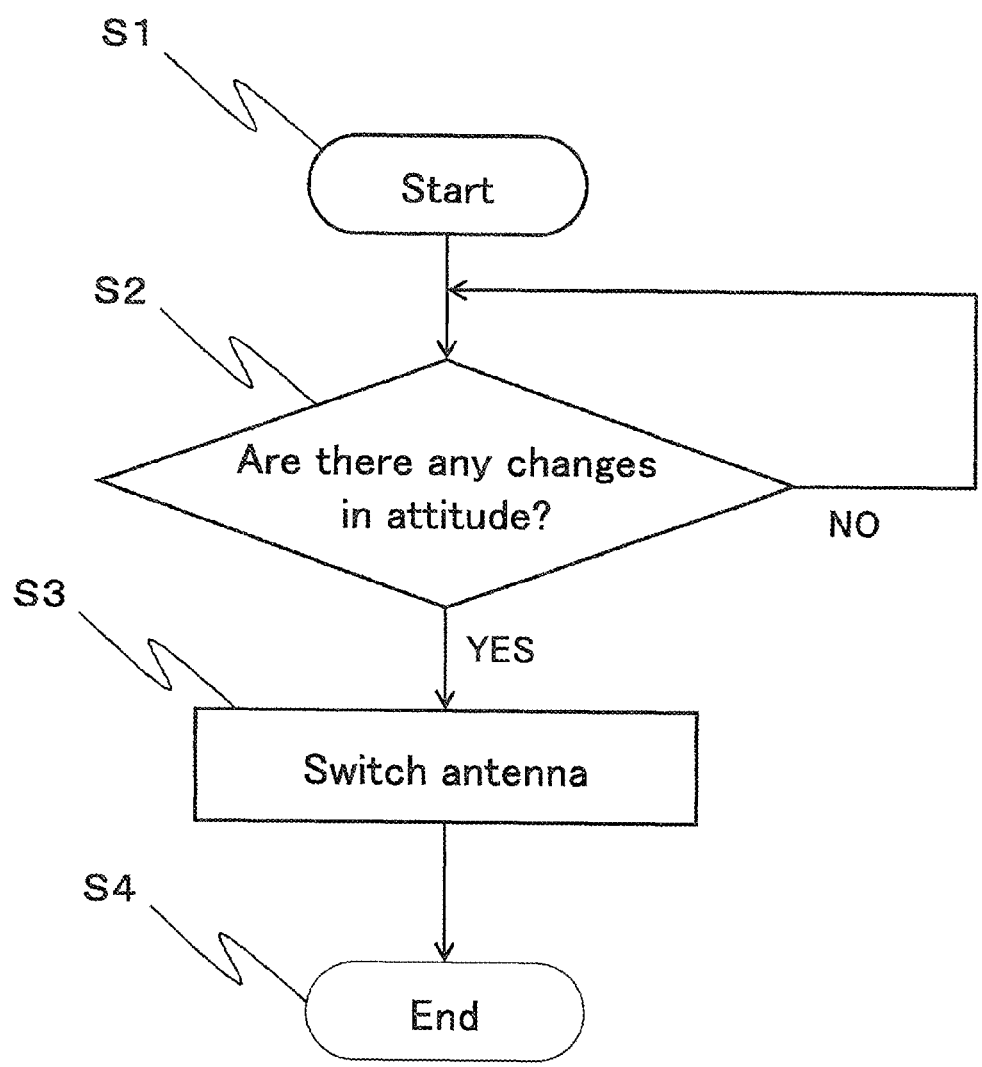
FIG. 6 is a flow chart for switching antennae of the PC.

Description of operation of the PC 1 formed as described above will be provided with reference to a flow chart shown in FIG. 6.

A user turns on the power of the PC 1, and the CPU 11 actuates the attitude sensor 8 (S1). The attitude sensor 8 determines whether the current attitude of the PC 1 is the clam shell state or the tablet state (S2). The attitude sensor 8 notifies the CPU (Central Processing Unit) 11 about the sensing result of the attitude. After receiving the notification, the CPU 11 controls the switch section 9 (S3). The switch section 9 conducts switching to receive information of an RFID tag by either the first antenna 6a or the second antenna 7a.

When wireless signals are to be received by an RFID antenna to which the switch section 9 has switched, either the first antenna 6a or the second antenna 7a receiving the wireless signals transmits the information received from RFID tag to the communication control section 10. The data received by the communication control section 10 is decoded by the communication control section 10 into data that can be handled by the CPU 11. The data decoded by the communication control section 10 is deciphered by the CPU 11, and used for controlling the PC 1. One example of the control of the PC 1 conducted by the CPU 11 is generation of a content that is to be displayed on the display section 3a.

When wireless signals are to be transmitted by an RFID antenna to which the switch section 9 has switched, the communication control section 10 sends information that is to be transmitted to an RFID tag to either the first antenna 6a or the second antenna 7a for transmitting wireless signals. The information is generated by the CPU 11, transmitted to the communication control section 10, and converted by the communication control section 10 into a format transmittable by each of the RFID antenna.

In the manner described above, data can be transmitted to and received from an externally located RFID tag, when an optimum antenna is selected in accordance with the attitude of the PC 1. It should be noted that the attitude sensor 8 may be actuated after the CPU 11 receives an instruction to send and receive information signals with respect to an RFID tag, the attitude sensor 8 may detect an attitude change of the PC 1, and the switch section 9 may switch antennae when there is a change in attitude. Specifically, this is achieved by a step of the user explicitly notifying the CPU 11 via an OS (Operating System) that an RFID tag is about to be presented, and a step of the CPU 11 that has received a notification actuating the attitude sensor 8.

[Advantageous Effects etc.]

The PC 1 of the present embodiment includes the attitude sensor 8 and the switch section 9 configured to switch a control content controlled by the communication control section 10 based on a sensing result from the attitude sensor 8, and thereby near field communication with respect to an external terminal can be finely conducted regardless of an attitude of the PC 1.

In particular, since the PC 1 of the present embodiment sharply distinguishes between a positional relationship in which both the display section and a transmission-and-reception surface of the first RFID reader are exposed on a side of the user and a positional relationship other than that, the PC 1 can conduct near field communication with an external terminal regardless of whether the PC 1 is in the clam shell form or the tablet form.

Furthermore, in the PC 1 of the present embodiment, the first RFID reader 6 is disposed on the palm rest, and the rear surface 3d of the second housing 3 covers the palm rest 2b and an operation section mainly in the tablet state, whereas the second RFID reader 7 is disposed on the opposite side of the operation section in the first housing. By having such a configuration, an RFID antenna is arranged at a location to which the user can easily present an external terminal regardless of whether the state of the PC 1 is in the clam shell form or the tablet form. It should be noted that, although, in the PC 1 of the present embodiment, the second RFID reader 7 is disposed on the reverse surface 2e immediately beneath the obverse surface 2c of the first housing 2 when compared to the arrangement position of the first RFID reader 6, this is merely one example. For example, it may be disposed on other locations on the reverse surface 2e. However, when the second RFID reader 7 is disposed on the immediately-beneath reverse surface, the user can easily and intuitively recognize a presentation location of each of the RFID reader. It should be noted that, although the first RFID reader 6 and the second RFID reader 7 are disposed respectively on the mutually opposing obverse surface 2c and reverse surface 2e in the PC 1 of the present embodiment, this is merely one example; and for example, the second RFID reader 7 may be disposed on a surface orthogonal to the surface on which the first RFID reader 6 is disposed.

It should be noted that, although description is provided regarding an example in which the first RFID reader 6 and the second RFID reader 7 are each singly provided, for example, a plurality of either one of them may be provided, or a plurality of both of them may be provided. In addition, although description is provided in which a combination of the first RFID reader 6 and the second RFID reader 7 communicate information with an external terminal conforming to a single standard, there may be a plurality of RFID readers for establishing information communication with an external terminal conforming to a certain standard, or a plurality of RFID reader each conforming to a standard different from others.

Furthermore, in the present embodiment, a convertible computer capable of reversibly assuming a clam shell form and a tablet form is used as an example. Therefore, description is provided regarding an example in which the first RFID reader 6 is disposed on the palm rest 2b where hands are rested when typing on the keyboard 2a in the clam shell form, and the second RFID reader 7 is disposed on the reverse surface 2e; however, this is merely one example. For example, it is possible to dispose the first RFID reader and the second RFID reader at positions that take into consideration the attitude of a computer even for a computer dedicated to be used in the clam shell form or a computer dedicated to be used in the tablet form. Furthermore, the PC 1 is not limited to a portable computer, and may be a stationary computer.

Furthermore, although description is provided in which the first RFID reader 6 and the second RFID reader 7 of the present embodiment send and receive wireless signals of an RFID tag in a frequency of 13.56 MHz conforming to ISO14443 standard, this is merely one example. Any frequency may be used as long as near field communication can be conducted with an adjacent RFID reader.

Although a three-dimensional gravity sensor is illustrated as the attitude sensor 8 for detecting the attitude of the PC 1 in the present embodiment, this is merely one example. For example, it is possible to use sensors such as acceleration sensors and magnetic sensors, or use a configuration in which the user instructs the attitude of the PC 1. It should be noted that, in the configuration in which the attitude of the PC 1 is detected using the sensor, it is possible to appropriately combine a gravity sensor, an acceleration sensor, and a magnetic sensor.

Furthermore, in the present embodiment, although the PC 1 is described as one example, electronic apparatuses such as mobile phones, cash registers, inventory management terminals, medical equipment terminals, and the like may be used.

As presented above, embodiments has been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. An electronic apparatus comprising:
   a first housing including an operation section configured to accept an input from a user;
   a second housing including a display section configured to present information to the user;
   a support configured to support a positional relationship between the first housing and the second housing in a shiftable manner at least between a first state and a second state;
   a first RFID reader and a second RFID reader configured to establish information communication with an external terminal located nearby via a transmission-and-reception surface by using near field communication;
   a communication control section configured to control a content of the information communication established with the first RFID reader or the second RFID reader;
   an attitude sensor configured to sense a shift in a positional relationship between the first housing and the second housing caused through the support; and
   a switch section configured to, based on a sensing result from the attitude sensor, cause the communication control section to control a content communicated by the first RFID reader in the first state, and cause the communication control section to control a content communicated by the second RFID reader in the second state.

2. The electronic apparatus according to claim 1, wherein the first state is a positional relationship in which both the display section and a transmission-and-reception surface of the first RFID reader are exposed on a side of the user, and the second state is a positional relationship other than the first state.

3. The electronic apparatus according to claim 1, wherein:
   the first RFID reader is disposed on a palm rest configured to support hands of the user for operating the operation section;
   the second housing covers the palm rest and the operation section; and
   the second RFID reader is disposed on the first housing on an opposite side of the operation section.

* * * * *